(12) United States Patent
Krasny et al.

(10) Patent No.: US 8,515,435 B2
(45) Date of Patent: Aug. 20, 2013

(54) ADAPTIVE MIMO ARCHITECTURE

(75) Inventors: Leonid Krasny, Cary, NC (US); Karl Molnar, Cary, NC (US); Jung-Fu Thomas Cheng, Cary, NC (US); Stephen Grant, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1061 days.

(21) Appl. No.: 11/045,877

(22) Filed: Jan. 28, 2005

(65) Prior Publication Data
US 2005/0181739 A1      Aug. 18, 2005

(30) Foreign Application Priority Data
Feb. 13, 2004   (SE) ..................... 0400370

(51) Int. Cl.
*H04W 72/00*   (2009.01)

(52) U.S. Cl.
USPC ....... 455/450; 455/63.1; 455/67.13; 455/101; 455/132; 370/208; 370/252; 370/310.2; 370/317; 370/322; 370/334; 370/335; 375/142; 375/147; 375/267; 343/853

(58) Field of Classification Search
USPC ...... 455/63.1, 67.13, 101, 132, 450; 370/208, 370/252, 310.2, 335, 317, 322, 334; 375/142, 375/147, 267; 343/853
See application file for complete search history.

(56) References Cited

U.S. PATENT DOCUMENTS

| | | | |
|---|---|---|---|
| 5,627,896 A | | 5/1997 | Southward et al. |
| 6,377,613 B1 * | | 4/2002 | Kawabe et al. ............... 375/142 |
| 6,463,099 B1 | | 10/2002 | Cao et al. |
| 6,473,467 B1 | | 10/2002 | Wallace et al. |
| 6,647,078 B1 | | 11/2003 | Thomas et al. |
| 6,687,492 B1 | | 2/2004 | Sugar et al. |
| 6,741,587 B2 * | | 5/2004 | Holma et al. ................. 370/362 |
| 6,799,055 B2 * | | 9/2004 | Heinila ........................ 455/526 |
| 6,831,943 B1 * | | 12/2004 | Dabak et al. .................. 375/147 |
| 6,870,515 B2 * | | 3/2005 | Kitchener et al. ............ 343/853 |
| 6,873,606 B2 * | | 3/2005 | Agrawal et al. .............. 370/310 |
| 6,912,195 B2 * | | 6/2005 | Vook et al. .................... 370/208 |
| 7,079,514 B2 * | | 7/2006 | Kim et al. ..................... 370/335 |
| 7,269,436 B2 * | | 9/2007 | Won ............................. 455/522 |
| 2001/0033622 A1 * | | 10/2001 | Jongren et al. ............... 375/267 |
| 2002/0158801 A1 | | 10/2002 | Crilly, Jr. et al. |

(Continued)

FOREIGN PATENT DOCUMENTS

| | | |
|---|---|---|
| EP | 0951091 A2 | 10/1999 |
| EP | 0966125 A1 | 12/1999 |

(Continued)

OTHER PUBLICATIONS

Lucent, "Increasing MIMI throughput with per antenna rate control" 3GPP TSG RAN WG1, R1-01-0879, Aug. 2001.*

(Continued)

*Primary Examiner* — Steve D Agosta
(74) *Attorney, Agent, or Firm* — Coats & Bennett, P.L.L.C.

(57) ABSTRACT

An adaptive transmission scheme provides multiple levels of adaptation. At a first level, a selection is made between a limited feedback or limited feedback scheme and a rich feedback scheme. At a second level of adaptation, a diversity mode is selected. Additional levels of adaptation could be employed.

35 Claims, 6 Drawing Sheets

(56) References Cited

U.S. PATENT DOCUMENTS

| | | | |
|---|---|---|---|
| 2002/0173302 A1* | 11/2002 | Baker et al. | 455/422 |
| 2003/0087605 A1 | 5/2003 | Das et al. | |
| 2003/0087673 A1 | 5/2003 | Walton et al. | |
| 2003/0139139 A1* | 7/2003 | Onggosanusi et al. | 455/63 |
| 2003/0139194 A1 | 7/2003 | Onggosanusi et al. | |
| 2003/0161258 A1 | 8/2003 | Zhang et al. | |
| 2004/0001537 A1 | 1/2004 | Zhang et al. | |
| 2004/0002364 A1 | 1/2004 | Trikkonen et al. | |
| 2004/0157643 A1* | 8/2004 | Brandes et al. | 455/561 |
| 2004/0246919 A1 | 12/2004 | Larsson | |
| 2005/0020237 A1* | 1/2005 | Alexiou et al. | 455/403 |
| 2005/0064908 A1* | 3/2005 | Boariu et al. | 455/562.1 |
| 2005/0111376 A1* | 5/2005 | Raghothaman et al. | 370/252 |
| 2005/0250544 A1* | 11/2005 | Grant et al. | 455/562.1 |
| 2006/0079221 A1* | 4/2006 | Grant et al. | 455/423 |

FOREIGN PATENT DOCUMENTS

| | | | |
|---|---|---|---|
| EP | 1309121 A1 | | 5/2003 |
| EP | 1337061 A1 | | 8/2003 |
| GB | EP 1351414 A2 | * | 10/2003 |
| JP | 2000069570 A | | 3/2000 |
| JP | 2003204298 A | | 7/2003 |
| WO | 01/78254 A1 | | 10/2001 |
| WO | 03034614 A1 | | 4/2003 |

OTHER PUBLICATIONS

S. Chung, A. Lozano, and H. Huang, "Approaching Eigenmode BLAST Channel Capacity Using V-BLAST with Rate and1 Power Feedback," 2001 IEEE, pp. 915-919.*

I R.W. Heath Jr., S. Sandhu, and A. Paulraj, "Antenna selection for spatial I multiplexing system with linear receivers," IEEE Commun. Lett. vol. 5, I pp. 142-144, Apr. 2001.*

Lucent, "Increasing MIMO throughput with per-antenna-rate-control," 3GPP TSG RAN WG1, R1-01-0879, Aug. 2001.

R.W. Heath Jr., and D.J. Love, "Multi-mode antenna selection for spatial multiplexing systems with linear receivers," in Proc. of Allerton Conf. on Cont., and Comp. Monticello, IL, Oct. 2003.

R. Narashimhan, "Spatial multiplexing with transmit antenna and constellaton selection for correlated MIMO fading channels," IEEE Trans. on Sig. Proc., vol. 51, p. 2829. Nov. 2003.

R.W. Heath Jr., S. Sandhu, and A. Paulraj, "Antenna selection for spatial multiplexing system with linear receivers," IEEE Commun. Lett. vol. 5, pp. 142-144, Apr. 2001.

D.A. Gore, R.W. Heath Jr, and A. Paulraj, "Transmit selection in spatial multiplexing systems," IEEE Commun. Lett., vol. 6, pp. 491-493, Nov. 2002.

S. J. Grant, J.-F. Cheng, L. Krasny, K. Molnar, and Y.-P. E. Wang, "Per-antenna-rate-control (PARC) in frequency selective fading with SIC-GRAKE receiver," in Proc. IEEE VTC'04—Fall, Los Angeles, CA, Sep. 2004.

S. J. Grant, K. J. Molnar, and G. Bottomley, "Generalized RAKE Receivers for MIMO Systems," Proc. Fall 2003, IEEE Vehicular Technology Conf., Orlando, Sep. 2003, pp. 424-428.

E. Dahlman, P. Beming, J. Knutsson, F. Ovesjo, M. Persson, and C. Roobol, "WCDMA—The Radio Interface for Future Mobile Multimedia Communications," IEEE Veh. Technology, vol. 47, No. 4, Nov. 1998, pp. 1105-1118.

S. M. Alamouti, "A Simple Transmit Diversity Technique for Wireless Communications," IEEE Journal on Select Areas of Communications, vol. 16, No. 8, Oct. 1998, pp. 1451-1458.

M. K. Varanasi and T. Guess, "Optimum Decision Feedback Multiuser Equalization with Successive Decoding Achieves the Total Capacity of the Gaussian Multiple-Access Channel," in Proc. Assilomar Conf. on Signals, Systems, and Computers, Monterey, CA, Nov. 1997, pp. 1405-1409.

K. Zangi and L. Krasny, "Maximizing Data Rate over $M$-Input/1-Output Channels," Proc. IEEE Vehicular Technology Conference, May 2002, pp. 938-942.

K. J. Molnar, S. J. Grant, L. Krasny and E. Englund, "Improved Packet Data Performance for WCDMA Using Multi-Antenna Techniques," Proc. Fall 2003 IEEE Vehicular Technology Conference, Orlando, Sep. 2003, pp. 642-646.

D. A. Gore and A. Paulraj, MIMO Antenna Subset Selection With Space-Time Coding, IEEE Transactions on Signal Processing, vol. 50, No. 10, Oct. 2002, pp. 2580-2588.

D.A. Gore and A. Paulraj, "Statistical MIMO Antenna Sub-set Selection with Space-Time Coding," Proc. International Conference on Communications 2002, Apr. 2002, pp. 641-645.

D.A. Gore, R.W. Heath Jr., and A. Paulraj, "Statistical Antenna Selection for Spatial Multiplexing Systems," Proc. International conference on Communications 2002, Apr. 2002, pp. 450-454.

S. Chung, A. Lozano, and H. Huang, "Approaching Eigenmode BLAST Channel Capacity Using V-BLAST with Rate and Power Feedback," 2001 IEEE, pp. 915-919.

Derryberry et al., "Transmit Diversity in 3G CDMA Systems," IEEE Communications Magazine, Apr. 2002, pp. 68-75, vol. 40, No. 4, IEEE, Piscataway, NJ, US.

Onggosanusi et al., "Performance Analysis of Closed-Loop Transmit Diversity in the Presence of Feedback Delay," IEEE Transactions on Communications, Sep. 2001, pp. 1618-1630, vol. 49, No. 9, IEEE, Piscataway, NJ, US.

Raghothaman et al., "Performance of Closed Loop Transmit Diversity with Feedback Delay," Conference Record of the 34th Asilomar Conference on Signals, Systems and Computers, Oct. 29-Nov. 1, 2000, pp. 102-105, vol. 1, Pacific Grove, CA, US.

3rd Generation Partership Project, Technical Specification, 3GPP TS 25.214 V5.7.0 (Release 5), Dec. 2003. 3GPP, France.

Krasny, L. et al., "Optimal and Reduced Complexity Receivers for MISO Antenna Systems", Conference Publication, Global Telecommunications Conference (GLOBECOM '03), Dec. 1, 2003, pp. 138-142, vol. 1. IEEE, US.

Zangi, K. et al., "Capacity-Achieving Transmitter and Receiver Pairs for Dispersive MISO Channels", IEEE Transactions on Wireless Communications, vol. 2, No. 6, Nov. 10, 2003, pp. 1204-1216. IEEE, US.

* cited by examiner

ADAPTIVE MIMO ARCHITECTURE

This application claims priority under 35 U.S.C. §119 to Swedish application no. 04003703 which was filed on 13 Feb. 2004, and which is incorporated herein by reference.

BACKGROUND OF THE INVENTION

The present invention relates to multi-antenna transmission schemes for wireless communication networks and more particularly, to an arrangement and a method for adapting between transmitter and receiver configurations responsive to channel conditions and other factors.

In most conventional second generation (2G) and third generation (3G) wireless communication systems, both the transmitter and receiver are equipped with a single antenna. Such systems are known as single input, single output (SISO) systems. In recent years, researchers have proposed using multiple antennas at the transmitter and/or receiver to improve performance of the communication system. Transmit diversity is one example of a multiple antenna transmission scheme that has been proposed as a way of improving the signal-to-interference ratio (SINR) at the receiver. As used herein, SINR includes noise interference. Transmit diversity systems are also known as multiple input, single output (MISO) systems. Transmit diversity or MISO systems employ multiple antennas at the transmitter to transmit a signal to the receiver. The signals from each transmit antenna arrive at the receiver through different propagation channels. The receiver can select the "best" signal (typically the one with the highest SINR), or can combine multiple signals to achieve a higher SINR through combining gain. Transmit diversity using space-time codes further improves the SINR by coding the transmit signal prior to transmission. While transmit diversity schemes realize improvements in the SINR, peak rate improvement is limited to single-antenna modulation and coding options.

Multiple input, multiple output (MIMO) systems employ multiple antennas at the receiver as well as at the transmitter. MIMO systems exploit the spatial dimensions of the signal at the receiver to achieve higher spectral efficiency and higher data rates without increasing bandwidth. The trade-off results in greater complexity of the transmitter and receiver. MIMO systems can be broadly classified as limited feedback and rich feedback systems. In limited feedback MIMO systems, only limited information concerning the communication channel is fed back from the receiver to the transmitter. Limited feedback systems improve the attainable peak transfer rate and are more advantageous in high SINR environments. In rich feedback systems, the receiver sends channel coefficients, or other information from which channel coefficients can be estimated, back to the transmitter. The transmitter can use the knowledge of the channel to filter the transmit signal prior to transmission. Rich feedback systems provide additional benefit due to array gain from multiple transmit antennas, which may be substantial for certain array configurations.

Unfortunately, there is no one system configuration that performs consistently better than the others over the range of possible operating conditions envisioned for deployment. Some of the operating conditions that affect performance include the expected operating SINR at the receiver; the propagation channel and interference environment observed at the receiver; the amount of channel feedback allowed; the assumed user data traffic; and the number of desired allowable transmit and receive antennas. What is desired is to have a robust approach that works well for different antenna configurations in a wide range of operating conditions.

SUMMARY OF THE INVENTION

The present invention relates to an adaptive transmission scheme having at least two levels of adaptation. At the first level, the feedback mode is selected based on some quality metric that indicates receiver performance. For example, the metric may be one or more SINRs at the output of the terminal receiver or the supportable data rate by the receiver. This quality metric may depend on a number of measurable quantities, including the number of the receive antennas, channel quality, mobile speed, the condition of the propagation channel, and/or the available bandwidth between the mobile station and base station. The terminal can calculate this quality metric and switch to the mode with satisfies the switch criterion. In one exemplary embodiment, the feedback modes include limited feedback mode and rich feedback mode. Transmitter configurations for limited feedback mode include a per antenna rate control (PARC) and spatial multiplexing (SM) combined with code reuse. In these approaches, a data stream is divided into multiple streams and each substream is transmitted from a different antenna. Transmitter configurations for rich feedback mode include matched field transmit diversity (MFTD) in which the data stream is divided into one or more substreams and each substream is prefiltered to match the channel to a selected receive antenna.

At the second level, a diversity mode is selected. When limited feedback mode is selected, selection of a diversity mode corresponds to selection of a number of antennas. When less than all transmit antennas are used, the selection may include the "best" subset of antennas. When rich feedback mode is selected, the selection of a diversity mode corresponds to selection of the number of data streams. When the number of data streams is less than the number of receive antennas, the selection may include the subset of receive antennas to which the prefilters are matched. The number of selection levels could also be greater than two, for example, once a limited feedback MIMO scheme has been selected, there may be multiple limited feedback MIMO schemes from which to choose.

DETAILED DESCRIPTION OF THE INVENTION

Figure 1:
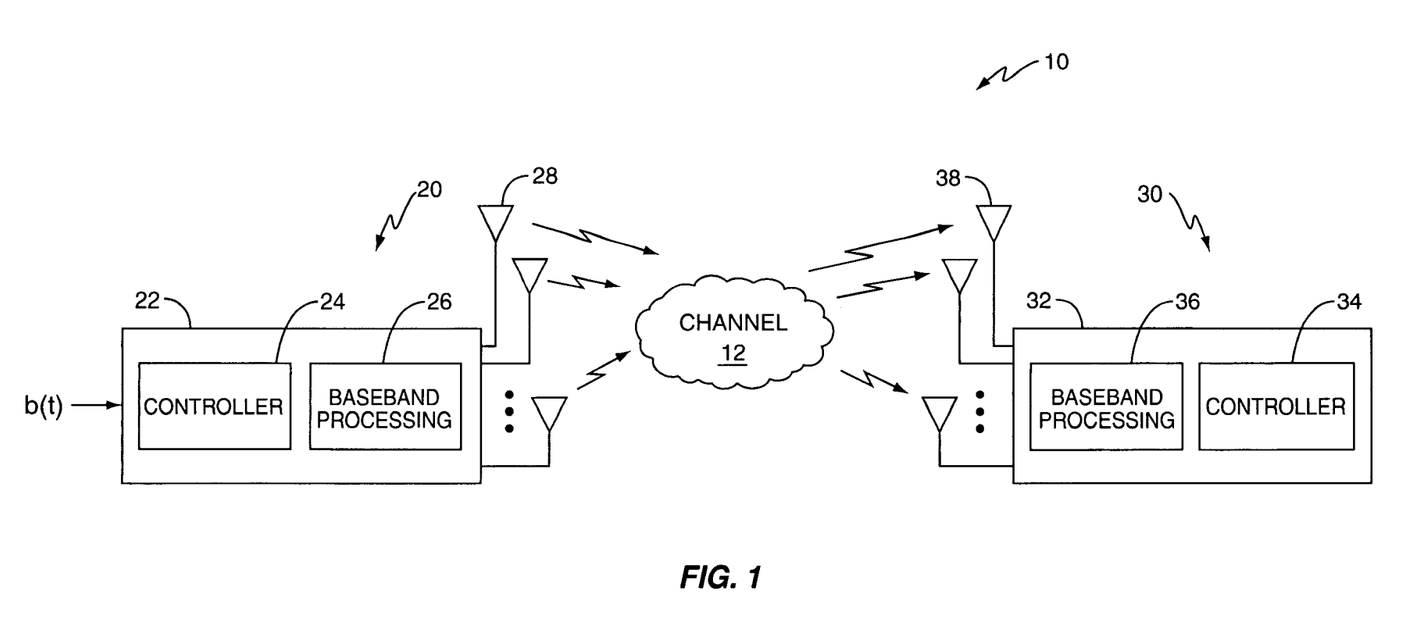
FIG. 1 illustrates a multiple input, multiple output communication system.

FIG. 1 illustrates a multiple input/multiple output (MIMO) wireless communication system 10 including a first station 20 and a second station 30. The first station 20 includes a transmitter 22 for transmitting signals to the second station 30, while the second station includes a receiver 32 for receiving signals transmitted by the first station 20. Those skilled in the art will appreciate that the first station 20 and second station 30 may each include both a transmitter 22 and receiver 32 as shown in FIG. 1 for bi-directional communications. In one exemplary embodiment, the first station 20 is a base station in a wireless communication network, and the second station 30 is mobile station.

An information signal in the form of a binary data stream is input to the transmitter 22 at the first station 20. The transmitter includes a controller 24, a transmit signal processing circuit 26, and a plurality of transmit antennas 28. The controller 24 controls operation of the transmitter 22. The transmit signal processing circuit 26 performs error coding and mapping of the input bits to complex modulation symbols. The transmit signal processing circuit 26 generates multiple transmit signals which may be independent, partially redundant, or fully redundant. After upward frequency conversion, filtering, and amplification, the transmit signals are transmitted from respective transmit antennas 28, through the communication channel 12, to the second station 30.

The receiver 32 at the second station 30 includes a controller 34, a receive signal processing circuit 36, and a plurality of antennas 38. The controller 34 controls operation of the receiver 32. The receive signal processing circuit 36 demodulates and decodes the signals received at each antenna 38. In the absence of bit errors, the output signal from the receiver 32 will be the same as the original information signal input at the transmitter 22. Because multiple data streams are transmitted in parallel from different antennas 28, there is a linear increase in throughput with every pair of antennas 28, 38 added to the system without an increase in the bandwidth requirement.

MIMO systems have been the subject of extensive research activity worldwide for use in wireless communication networks because of their potential to achieve high spectral efficiencies, and therefore high data rates. Many types of MIMO systems have been proposed, which may be generally classified as either rich feedback or limited feedback. In rich feedback MIMO systems, the transmitter receives feedback of channel coefficients from the receiver, which is referred to herein as rich feedback. In limited feedback MIMO systems, the transmitter receives limited feedback of channel state information. This limited feedback typically does not include channel coefficients, but may include channel state information such as the SINR of the communication channel.

Figure 2:
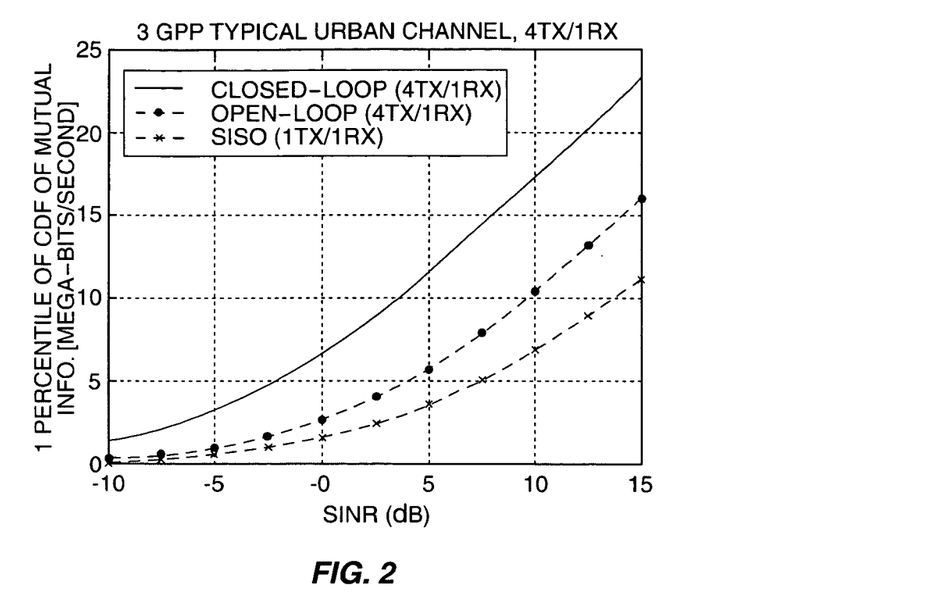
FIGS. 2-4 compare performance of SISO, MISO, and MIMO systems with different antenna configurations.
Figure 3:
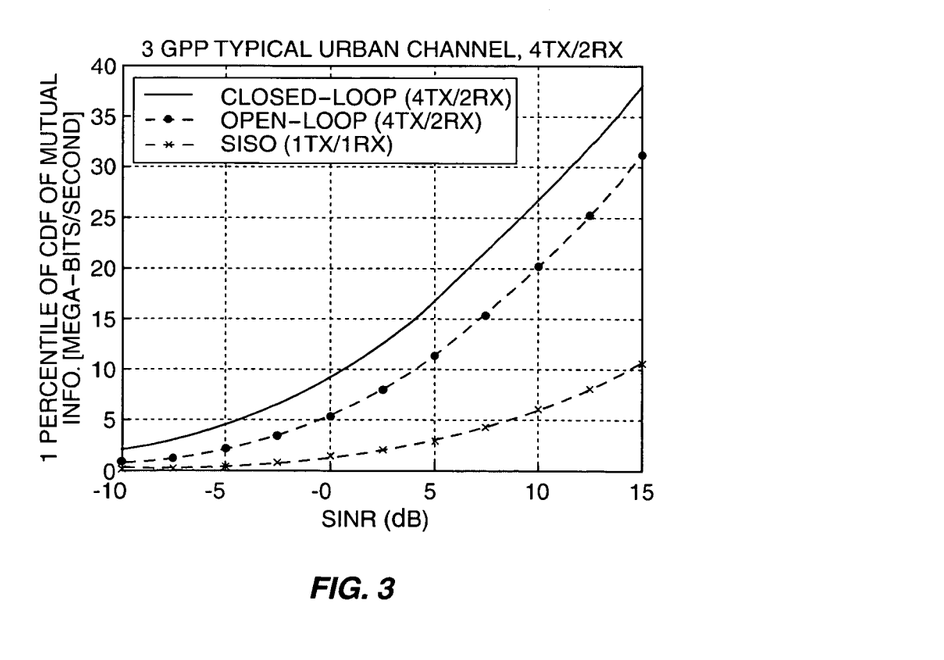
Figure 4:
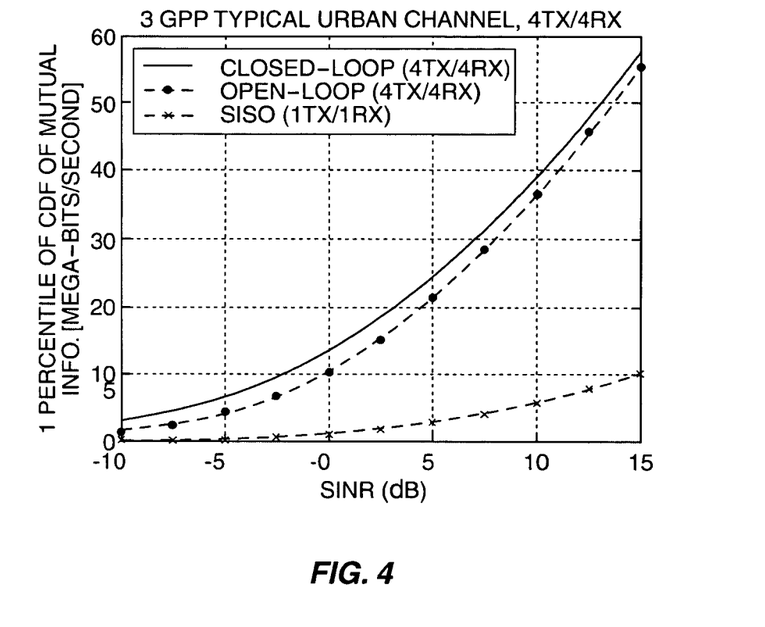

Rich feedback systems, in general, provide improved performance over limited feedback systems because such systems have greater knowledge of the communication channel but require feedback of channel coefficients. The amount of feedback is proportional to the number of transmit antennas, the number of receive antennas, and the channel's delay spread. FIGS. 2-4 compare the performance of rich feedback and limited feedback multiple antenna systems for a variety of antenna configurations. FIG. 2 compares limited feedback and rich feedback capacity in a 4×1 multiple input, single output (MISO) system. FIG. 3 compares limited feedback and rich feedback capacity in a 4×2 MIMO system. FIG. 4 compares limited feedback and rich feedback capacity in a 4×4 MIMO system.

In the cellular environment, the channels are random variables; hence, the mutual information corresponding to each transmission scheme is also a random variable with a certain cumulative distribution function (CDF). FIGS. 2-4 graph the SINR versus the 1% point of the CDF of the mutual information for various system configurations. This point on the CDF is sometimes referred to as the mutual information resulting in 1% outage probability, i.e. the mutual information of each scheme exceeds the corresponding 1 percentile value with probability of 0.99. The solid curves on these figures correspond to the rich feedback capacity, the dashed curves with stars, "*," correspond to the limited feedback capacity, and the dashed curves with "x" correspond to a single input, single output (SISO) system with one transmit antenna and one receive antenna.

In the 4×1 MISO system (FIG. 2), closed-loop rich feedback capacity gains 6 dB over limited feedback capacity due to diversity and antenna array gains. Furthermore, the limited feedback capacity is not much greater than the capacity of the SISO channel over a wide range of operating SINRs. This indicates that some form of transmit diversity is beneficial in order to obtain increased rates. For a 4×2 MIMO system (FIG. 3), there is still significant gap of approximately 4.5 dB between the rich feedback and limited feedback capacity. This is somewhat less than for the 4×1 system, but it still indicates significant performance advantage of the slesed-leap rich feedback MIMO system as compared to the limited feedback MIMO system. For the 4×4 MIMO system (FIG. 4), the gap shrinks to approximately 3 dB, and occurs mostly at low SINRs.

Exemplary limited feedback MIMO systems use per antenna rate control (PARC) techniques or spatial multiplexing (SM) techniques combined with code reuse. In the limited feedback configurations, a single input data stream is split into multiple data streams, which are mapped to different transmit antennas. In the PARC approach, described more fully below, each substream is independently coded and modulated. In the SM approach, the input data stream is coded before it is split and the individual substreams are then independently modulated and transmitted. An exemplary rich feedback system uses matched field transmit diversity (MFTD), also known as transmit diversity with rich feedback (TDRF), which is described in more detail below. In the rich feedback MIMO system using MFTD, the input data stream is transmitted from multiple transmit antennas 28 to a receiver 32 with one or more receive antennas 38. The input stream is pre-filtered to match the channel between the transmit and receive antennas 28, 38.

Figure 5:
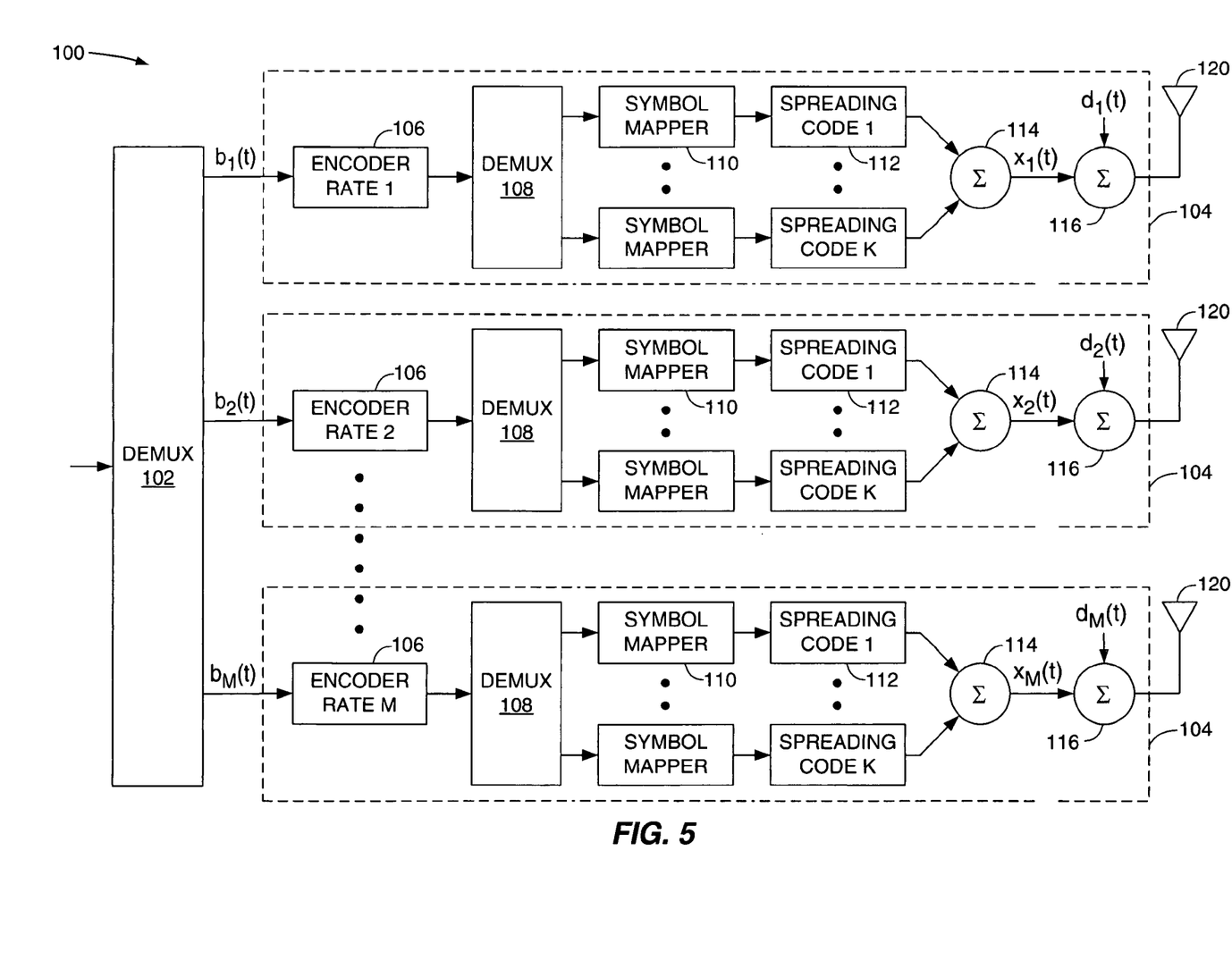
FIG. 5 illustrates an exemplary limited feedback transmitter configuration using per antenna rate control.

FIG. 5 illustrates an exemplary transmitter 100 configuration for limited feedback mode employing the per antenna rate control (PARC) approach. As those skilled in the art will appreciate, PARC is a multiple stream transmitting technique used in wireless communication systems to increase system capacity. Transmitter 100 in the exemplary embodiment is configured for the High-Speed Downlink Packet Access (HSDPA) mode of WCDMA.

The transmitter 100 in FIG. 5 comprises a demultiplexer 102 to divide the original information bit stream I into M bit streams $\{b_1(t), b_2(t), \ldots b_M(t)\}$, coding and modulation circuits 104 for each bit stream, and a plurality of antennas 120. The coding and modulation circuit 104 for each bit stream $\{b_1(t), b_2(t), \ldots b_M(t)\}$ comprises an encoder 106 to encode each bit stream $\{b_1(t), b_2(t), \ldots b_M(t)\}$, a plurality of demultiplexers 108 to further divide each bit stream $\{b_1(t), b_2(t), \ldots b_M(t)\}$ into substreams, a plurality of symbol mappers 110 to map each substream to a point on a signaling constellation, a plurality of signal spreaders 112 to apply a selected spreading code to each substream, and a combiner 114 to recombine the sub-streams to generate a transmit signal $\{x_1(t), x_2(t), \ldots x_M(t)\}$ for transmission. The transmit signals $\{x_1(t), x_2(t), \ldots x_M(t)\}$ may be further combined by combiner 116 with one or more other simultaneously transmitted signals $d_m(t)$ that contain a number of dedicated channels and control channels, as well as a common pilot channel. The encoders 106 for each bit stream $\{b_1(t), b_2(t), \ldots b_M(t)\}$ encode the original information bits at different rates. The rates depend on the channel quality indicator (CQI) feedback from the receiver 32. The coded signal output by each encoder 106 is then divided into K substreams by demultiplexers 108. Each sub-stream is mapped to symbols by one of K symbol mappers 110, and spread with one of K spreading codes by signal spreaders 112. The K spreading codes may be reused on the different antennas 120. The combiner recombines the K spread signals from each signal spreader 112. In FIG. 5, the number of coded signals and the number of transmit antennas 120 are the same. However, in other embodiments, the number of coded signals could be equal to or fewer than the number of transmit antennas 120.

Figure 6:
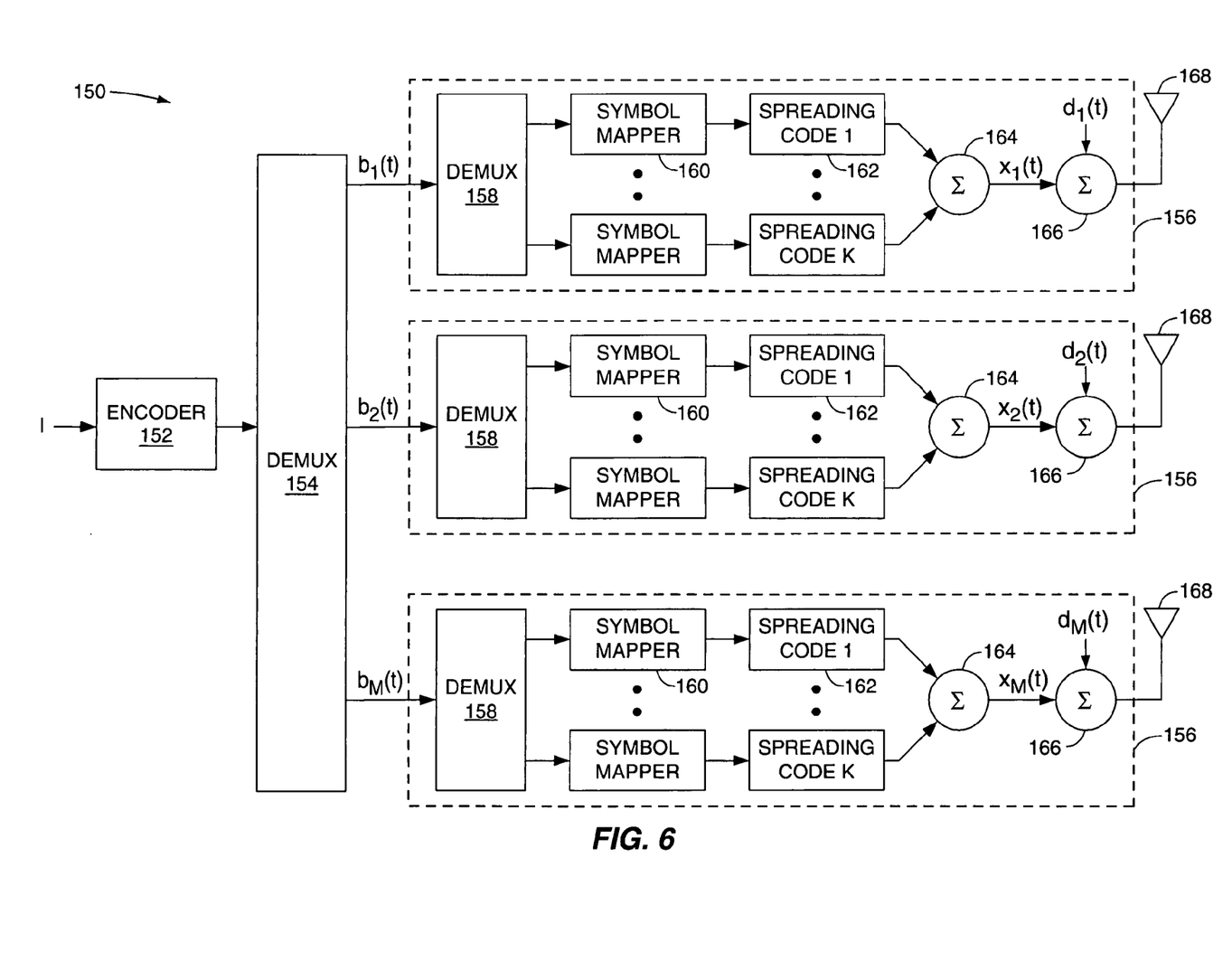
FIG. 6 illustrates an exemplary limited feedback transmitter configuration using spatial multiplexing with code reuse.

FIG. 6 illustrates an exemplary transmitter configuration 50 for limited feedback mode employing spatial multiplexing (SM) with code reuse. The transmitter configuration 150 shown in FIG. 6 comprises an encoder 152 to encode the original information stream I to generate a coded bitstream, a demultiplexer 154 to divide the coded bitstream into N bitstreams $\{b_1(t), b_2(t), \ldots b_M(t)\}$, modulation circuits 156 for each bitstream, and a plurality of antennas 168. The modulation circuit 156 for each bitstream comprises a demultiplexer 158 to further divide each substream into a larger number of substreams, a plurality of symbol mappers 160 to map each substream to a point on a signaling constellation, a plurality of signal spreaders 162 to apply a selected spreading code to each substream, and a combiner 164 to recombine the substreams to generate a transmit signal $\{x_1(t), x_2(t), \ldots x_M(t)\}$ for transmission to the second station 30. The transmit signals $\{x_1(t), x_2(t), \ldots x_M(t)\}$ may be further combined by combiner 166 with one or more other simultaneously transmitted signals $d_m(t)$ that contain a number of dedicated channels, control channels, as well as a common pilot channel.

Figure 7:
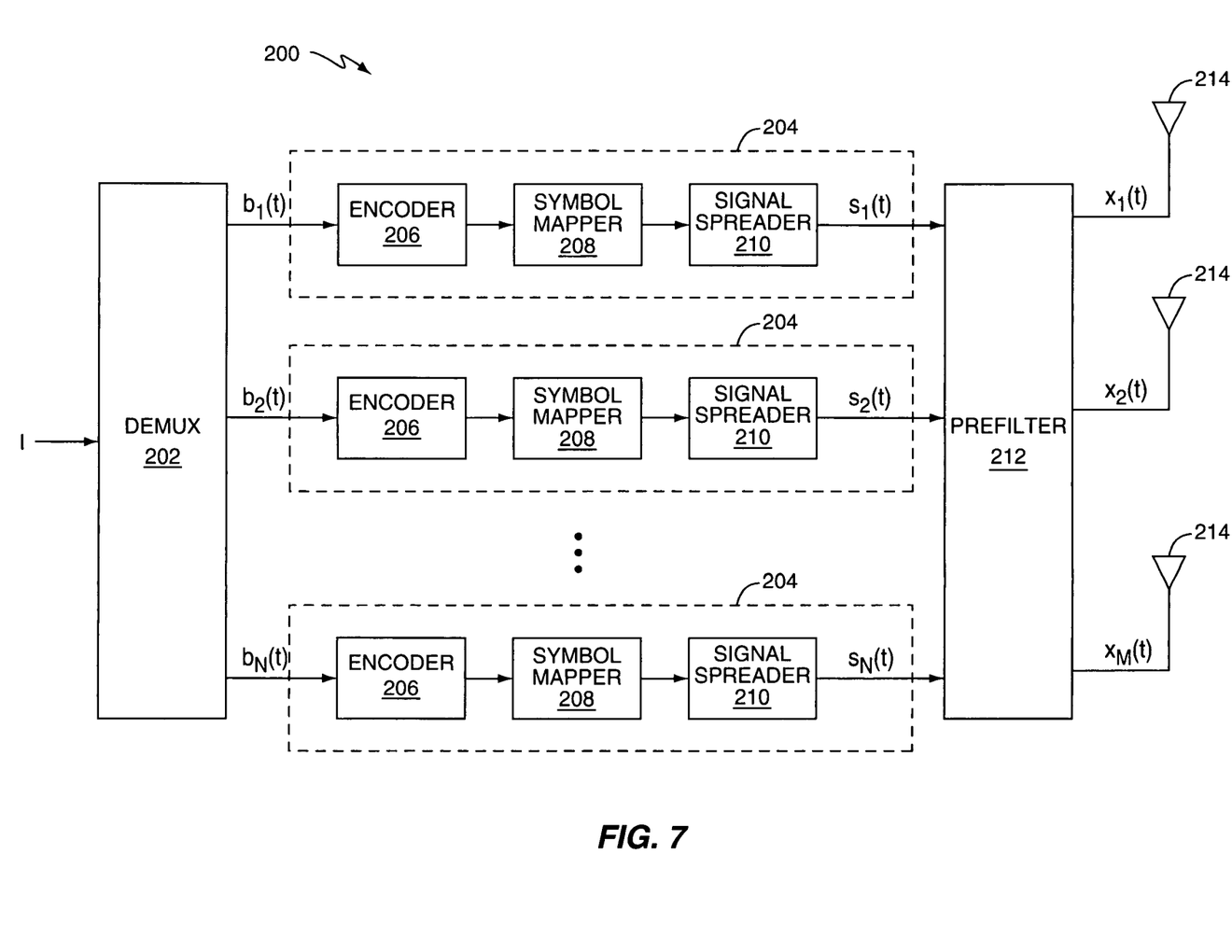
FIG. 7 illustrates an exemplary rich feedback transmitter configuration using matched field transmit diversity.

FIG. 7 illustrates an exemplary transmitter configuration 200 for a rich feedback mode system. The transmitter 200 of FIG. 7 employs what is referred to herein as a matched field transmit diversity (MFTD). The transmitter configuration 200 shown in FIG. 7 includes a demultiplexer 202 to divide the information bitstream into a plurality of bitstreams, a coding and modulation circuit 204 for each bitstream, a prefilter 212 matched to the communication channel between the transmitter and the receiver, and a plurality of transmit antennas 214. Each coding and modulation circuit 204 includes an encoder 206 to encode a corresponding bitstream, a symbol mapper 208 to map the coded bits to modulation symbols, and a signal spreader 210 to apply a selected spreading code to each substream. The signals output from the modulation and encoding circuits 204 are the transmit signals $s_1(t), \ldots s_N(t)$ to be transmitted to the second station 30, where N is less than or equal to the number of antennas at the receiver 32. The transmit signals $s_1(t), \ldots s_N(t)$ are input to a prefilter 212. The prefilter filters the transmit signals based on knowledge of the communication channel between the transmitter 22 and the receiver 32. The prefilter outputs filtered signals $x_1(t), \ldots x_M(t)$ to the antennas 214 for transmission to the second station 30, where M is the number of transmit antennas 214.

The following discussion explains how the filters for the prefilter 212 are computed. It is assumed that the signals $s_1(t), \ldots S_N(t)$ input to the prefilter 212 are mutually independent and each one has a power spectrum $\Lambda(f)$ within the channel bandwidth. The power spectrum of the transmit signal vector $S(t)=[s_1(t), S_2(t), \ldots S_N(t)]$ is denoted by $P_{SS}(f)$. The power spectrum of the filtered signal vector $X(t)$ may be expressed in terms of $P_{XX}(f)$ according to:

$$P_{XX}(f; m, p) = \Lambda(f) \sum_{n=1}^{N} G(f; n, m) G^*(f; n, p) \quad \text{Eq. (1)}$$

where $\Lambda(f)$ is a real-valued function chosen to ensure that the total power emitted from the transmitter is fixed, and $G(f;n,m)$ is the frequency response of the downlink channel from the mth transmit antenna to the nth receive antenna.

As seen in FIG. 7, the MFTD transmitter 200 consists of N parallel data streams or subchannels and M antennas 214. Each of the N parallel data streams have two parts: 1) a modulation and coding circuit 204 that maps information bits to scalar-valued waveforms, and 2) a single input, multiple output bank of matched filters that form a part of prefilter 212. Denoting these matched filters by $H(f;n,m)$, then the filters may be represented by $$H(f; n, m) = \frac{G^*(f; n, m)}{\sqrt{\sum_{n=1}^{N} \sum_{m=1}^{M} |G(f; n, m)|^2}} \quad \text{Eq. (2)}$$

The filters given by Eq. 2 have several interesting properties. First, their frequency response is a product of two terms. The first term $G^*(f; n,m)$ in the numerator is a filter matched to the downlink channel between the mth transmit antenna and the nth receive antenna. The second term $$\sqrt{\sum_{n=1}^{N} \sum_{m=1}^{M} |G(f; n, m)|^2}$$

in the denominator may be viewed as a whitening filter for the information signal. Secondly, Eq. 2 results in a loose form of water pouring in the following sense. If one of the downlink channels at a particular frequency is severely attenuated, the power out of the corresponding transmit antenna 214 will also be proportionally attenuated at this frequency. With the total power out of the antenna 214 being constant, the transmitter 200 will then pour more power into those frequencies where the downlink channels are not attenuated.

A simplication can be obtained by ignoring the frequency depending term $$\sqrt{\sum_{n=1}^{N} \sum_{m=1}^{M} |G(f; n, m)|^2}$$

in the denominator. This approximation leads to the following form of the pre-filters 212:

$$H(f;n,m) = \lambda G^*(f;n,m) \quad \text{Eq. (3)}$$

where $\lambda$ is a scale factor chosen to ensure that the total transmitted power is $\sigma_x^2$, i.e.

$$\lambda = \frac{\sigma_X}{\sqrt{\sqrt{\sum_{n=1}^{N} \sum_{m=1}^{M} \int |G(f; n, m)|^2 df}}} \quad \text{Eq. (4)}$$

Implementation of the filters given by Equation 3 is very simple; since, the impulse response of $G^*(f;n,m)$ is simply $g^*(-t;n,m)$. This implies that the filters can be implemented in transmitter 200 by a simple FIR filter matched to the original downlink channel. Based on this observation, the downlink-channel from the m-th transmit antenna 214 to the n-th receive antenna 38 may be modeled as:

$$g(t; n, m) = \sum_{k=1}^{K} \alpha_K(n, m)\delta(t - \tau_k) \quad \text{Eq. (5)}$$

Then the impulse response of the m-th filter in the n-th subchannel has the form $$h(t; n, m) = \lambda \sum_{k=1}^{K} \alpha_K^*(n, m)\delta(t + \tau_k) \quad \text{Eq. (6)}$$

A base station with the transmitter structure of FIG. 7 needs only to form these matched filters based on the knowledge of the downlink channels available at the base station.

To reduce the amount of feedback overhead for MFTD scheme, matched filters h (t; n, m) based on only partial channel state information may be used. The idea of the MFTD scheme is based on using suboptimal FIR pre-filters with limited number of taps. The coefficients $\hat{\alpha}_K^*(n, m)$ for these pre-filters can be chosen to equal the L strongest channel coefficients or can be chosen based on the fixed-grid approach, where a grid of evenly-spaced L fingers is placed on a "region" of signal energy indicated by the power/delay profile, and where L is less than or equal to the number of channel coefficients. With this simplified approach, the impulse response of the m-th filter in the n-th sub-channel has the form $$\hat{h}(t; n, m) = \lambda \sum_{k=1}^{L} \hat{\alpha}_K^*(n, m)\delta(t + \tau_k) \quad \text{Eq. (7)}$$

This MFTD scheme allows the reduction of the amount of feedback and at the same time achieves most of the rich feedback capacity of dispersive channels. The proposed MFTD transmitter configuration can also operate with $N_c$ multicodes which are reused on each transmit antenna. The multicodes are reused to avoid excessive consumption of code resources when transmitting with multiple antennas.

According to the present invention, the transmitter 20 can be configured for a rich feedback mode of operation, and a limited feedback mode of operation at different times based on the expected performance of the receiver in each feedback mode. Factors relevant to determining the expected performance include the channel parameters, code and power availability, receiver antenna configuration, and operating conditions. In general, rich feedback mode is selected when the increase in the expected performance of rich feedback mode over limited feedback mode justifies the additional overhead required to feedback channel coefficients. For the limited feedback mode, the transmitter configurations shown in FIGS. 5 and/or 6 may be used. For the rich feedback mode, the transmitter configuration shown in FIG. 7 may be used.

The feedback mode can be changed during transmission as conditions change based on one or more quality metrics indicative of the expected performance of the receiver. For example, one quality metric may be the SINR at the output of the receiver 32 or the supportable data rate of the receiver 32. The quality metric may depend on a number of factors including the number of receive antennas 38, mobile station speed or velocity, and channel conditions. Thus, in the present invention the feedback mode is adapted as the operating conditions change to maximize performance.

Additional levels of adaptation can be employed in addition to the adaptation of the feedback mode. For example, a selection may be made between the two different limited feedback modes shown in FIGS. 5 and 6. Additionally, a diversity mode may be selected after the feedback mode is selected. The selection of a diversity mode may depend, for example, on channel parameters, code availability, and power availability.

When a limited feedback mode is selected, the various diversity modes correspond to different antenna configurations at the transmitter 22. Thus, selection of the diversity mode means the selection of the number of antennas 28 and which antennas 28 to use for transmission to the mobile station 30 giving rise to a selective PARC (S-PARC) scheme (FIG. 5) or a selective spatial multiplexing coding (S-SM) scheme (FIG. 6). When rich feedback mode is selected, the various diversity modes correspond to different pre-filter configurations. Thus, selection of the diversity mode means selection of the number of pre-filters 212 or data streams at the transmitter 22 and selection of the number of receive antennas 38 at the receiver 32 to which the pre-filters 212 are matched giving rise to a selective MFTD (SMFTD) scheme.

In one exemplary embodiment described below, the diversity mode for an limited feedback mode is selected based on the expected SINR or supportable data rate at the receiver 32. Both S-PARC and S-SM will be elaborated further below using the High-Speed Downlink Packet Access (HSDPA) provision in the Wideband Code Division Multiple Access (W-CDMA) standard as an example. The discussion below considers the case of two transmit antennas 28. The possible antenna configurations are {A}, {B}, or {A, B}. We will also add an additional case of {B, A} for S-PARC. Here the ordering indicates the decoding order of the receiver operation of S-PARC. For S-PARC, decoding order might have a small impact on the supportable data rate in dispersive channels. Thus, it may be advantageous, as far as maximizing the achievable data rate is concerned, to consider different decoder ordering for a given antenna combination. However, in most channel conditions, the difference between the achievable data rates of {A, B} and {B, A} is very small, and thus to minimize complexity, it might be advantageous to consider only one decoder ordering for a given antenna combination.

For S-PARC, an active antenna 28 transmits one self-decodable data stream. The transmission rate of a data stream is determined by the symbol signal-to-interference-plus-noise ratio (SINR), indicative of receiver performance. In the discussion below, we will use SIC-GRAKE output SINR as an example. The SIC-GRAKE described in co-pending U.S. patent application Ser. No. 00/795,101 filed Mar. 5, 2004, which is incorporated herein by reference.

It is assumed that all available power is allocated evenly among all active transmit antennas 28. For antenna configuration {A}, all the available power P is allocated to transmit antenna A, resulting in power per channelization code as P/K, where K is the number of channelization codes. Since there is only one active antenna 28, there is no need to perform successive interference cancellation (SIC) after G-RAKE. In this case, G-RAKE output SINR can be shown as $$SINR_{\{A\}}(A) = \frac{P}{K}h(A)^H R_{\{A\}}^{-1}(A)h(A), \quad \text{Eq. (8)}$$

where h(A) is the net response corresponding to the channel associated with antenna A and $R_{\{A\}}(A)$ is the noise covariance. The subscript to noise covariance denotes that the noise covariance depends on the antenna configuration. In practice, in this case, both the net response and the noise covariance can be determined from measurements on the Common Pilot Channel. The relation $R_{\{A\}}(A)=R_{CPICH}(A)$ denotes that the noise covariance can be measured from the Common Pilot Channel. The supportable data rate can then be determined by the G-RAKE output SINR though a table-lookup or through a SINR-to-data-rate mapping function, $$\text{Rate}(\{A\})=f(SINR_{\{A\}}(A)) \qquad \text{Eq. (9)}$$

Similarly, for antenna configuration {B}, the G-RAKE output SINR can be shown as, $$SINR_{\{B\}}(B) = \frac{P}{K}h(B)^H R_{\{B\}}^{-1}(B)h(B), \qquad \text{Eq. (10)}$$

where h(B) is the net response corresponding to the channel associated with antenna B and $R_{\{B\}}$ (B) is the noise covariance. Again, in this case, both the net response and the noise covariance can be measured from the Common Pilot Channel. The relation $R_{\{B\}}(B)=R_{CPICH}(B)$ denotes that the noise covariance can be measured from the Common Pilot Channel. There are cases where $R_{CPICH}(A)=R_{CPICH}(B)$. The supportable data rate for this case is $$\text{Rate}(\{B\})=f(SINR_{\{B\}}(B)). \qquad \text{Eq. (11)}$$

For antenna configuration {A,B}, each antenna is allocated with power P/12; the antenna A signal will be decoded first and the antenna B signal will be decoded last. In this case, the G-RAKE output SINR for antenna A signal is $$SINR_{\{A,B\}}(A) = \frac{P}{2K}h(A)^H R_{\{A,B\}}^{-1}(A)h(A), \qquad \text{Eq. (12)}$$

where the noise covariance becomes $$R_{\{A,B\}}(A) = R_{CPICH}(A) + \frac{P}{2K}h(B)h^H(B).$$

The additional term on the right-hand side of the equation accounts for the code-reuse interference, resulting from the same channel code being used for transmitting the antenna B signal. [041] For antenna B signal, SIC will be used, as the G-RAKE output SINR reflecting SIC is $$SINR_{\{A,B\}}(B) = \frac{P}{2K}h(B)^H R_{\{A,B\}}^{-1}(B)h(B), \qquad \text{Eq. (13)}$$

where the noise covariance is $$R_{\{A,B\}}(B) = R_{CPICH}(B) - \frac{P}{2}R_{SIC}(A).$$

The second term on the right-hand side of the equation accounts for interference from antenna A signal that is removed by the SIC process. The supportable data rate for this antenna configuration can be determined by $$\text{Rate}(\{A, B\})=f(SINR_{\{A,B\}}(A))+f(SINR_{\{A,B\}}(B)) \qquad \text{Eq. (14)}$$

Similarly, for antenna configuration {B, A}, the G-RAKE output SINR for antenna B signal is $$SINR_{\{B,A\}}(B) = \frac{P}{2K}h(B)^H R_{\{B,A\}}^{-1}(B)h(B),$$

where the noise covariance becomes $$R_{\{B,A\}}(B) = R_{CPICH}(B) + \frac{P}{2K}h(A)h^H(A). \qquad \text{Eq. (15)}$$

For antenna A signal, the G-RAKE output SINR reflecting SIC is $$SINR_{\{B,A\}}(A) = \frac{P}{2K}h(A)^H R_{\{B,A\}}^{-1}(A)h(A),$$

where the noise covariance is $$R_{\{B,A\}}(A) = R_{CPICH}(A) - \frac{P}{2}R_{SIC}(B).$$

The supportable data rate for this antenna configuration can be determined by $$\text{Rate}(\{B, A\})=f(SINR_{\{B,A\}}(B))+f(SINR_{\{B,A\}}(A)). \qquad \text{Eq. (16)}$$

With the supportable data rate for each of the antenna configurations, the base station controller 24 or mobile station controller 34 can choose the one having the highest achievable data rate. It can be seen in the above example that, the calculation of supportable data rate depends on power allocation (P), code allocation (K), and channel parameters (h(A), h(B), $R_{\{A\}}$ (A), $R_{\{B\}}$ (B), $R_{\{A,B\}}$(A),$R_{\{A,B\}}$ (B),$R_{\{B,A\}}$(A), $R_{\{B,A\}}$ (B) ). Those skilled in the art will find that this easily generalizes to the case of having more than two transmit antennas 28.

For selective spatial multiplexing code, the same procedure as described earlier for S-PARC applies. The only difference is the SINR formulation and the SINR-to-data-rate mapping function for antenna configurations {A,B}. The achievable data rate for antenna configurations {A}, and {B} of S-SM are exactly the same as those for S-PARC. Thus, we will only discuss the case of {A,B}.

The SINRs at the G-RAKE output in this case are $$SINR_{\{A,B\}}(A) = \frac{P}{2K}h(A)^H R_{\{A,B\}}^{-1}(A)h(A), \qquad \text{Eq. (17)}$$

and $$SINR_{\{A,B\}}(B) = \frac{P}{2K}h(B)^H R_{\{A,B\}}^{-1}(B)h(B), \qquad \text{Eq. (18)}$$

where the noise covariances are $$R_{\{A,B\}}(A) = R_{CPICH}(A) + \frac{P}{2K}h(B)h^H(B)$$

and $$R_{\{A,B\}}(B) = R_{CPICH}(B) + \frac{P}{2K}h(A)h^H(A).$$

One method for determining the achievable data rate is based on the sum of the individual SINR values, and is given as $$\text{Rate}(\{A, B\}) = f(SINR_{\{A,B\}})(A) + f(SINR_{\{A,B\}}(B)). \quad \text{Eq. (19)}$$

Other methods may also be considered, such as those based on the geometric (rather than arithmetic) mean. With the supportable data rate for each of the antenna configurations, the base station controller 24 or mobile station controller 34 can choose the one having the highest achievable data rate. In can be seen in the above example that, the calculation of supportable data rate depends on power allocation (P), code allocation (K), and channel parameters (h(A),h(B),$R_{\{A\}}$ (A), $R_{\{B\}}$ (B),$R_{\{A,B\}}$ (A),$R_{\{A,B\}}$ (B)).

The decision making for the determination of the diversity mode for limited feedback transmitter configurations can be made at the mobile station 30, at the base station 20, or are divided between the base station 20 and mobile station 30. In the first approach (all decisions made at the mobile station 30), the mobile station 30 estimates the SINRs for all possible antenna combinations and chooses that particular combination that results in the maximum sum data rate over substreams. It then feeds back a rate indicator, or CQI (Channel Quality Indicator) for each stream, i.e., if mode-N is selected where N is the selected number of antennas, then N CQIs are signaled back where N≦M. The CQI is typically a mapping from SINR to data rate. It also needs to signal the antenna selection from the $2^M-1$ possibilities, requiring M bits.

In the second approach (all decisions made at the base station 20), the mobile station 30 estimates the SINRs for all possible mode and antenna selection combinations. However, because no decision is made at the mobile station 30 as to which is the best one, the mobile station 30 must feedback CQI values for all possible combinations leading to very large feedback load. For example, for s-parc with 4 transmit antennas 28, the mobile station 30 would need to feedback one CQI for each of the 4 mode-1 antenna selections, 2 CQIs for each of the 6 mode-2 antenna selections, 3 CQIs for each of the 4 mode-3 antenna selections, and 4 CQIs for the single mode-4 selection, resulting in a total of 32 CQI values. This is compared to the first approach where the feedback load is 4 or fewer CQIs and one antenna selection indicator. As such, allowing the base station 20 to have full freedom to do both mode and antenna selection requires a large amount of feedback.

In the third approach (division of decision making between mobile station 30 and base station 20), the mobile station 30 selects the antennas for each possible mode, and the base station 20 selects the mode. In this way, the feedback is reduced significantly as compared to the second approach. In fact, if the antenna selections are restricted to obey a certain property (called the subset property) the feedback may be reduced to a level only slightly greater than the first approach. While this approach is suboptimal, the loss in performance is small. Without using the subset property, however, the feedback load for the example of M=4 transmit antennas would be 1 CQI for mode-1, 2 CQIs for mode-2, 3 CQIs for mode-3, and 4 CQIs for mode-4, resulting in a total of 10 CQIs. In addition, an antenna selection indicator would be required for each mode. Clearly, the required feedback load is much less than the second approach, which requires 32 CQIs.

As explained in UK Patent No. 2358071 issued on Apr. 2, 2003 which is incorporated by reference in its entirety, if the subset property is invoked, the feedback load may be reduced to only M=4 CQIs and one decoding order. This is only slightly more than the maximum feedback load for the first approach, which requires N=4 CQIs (when mode-4 is selected) and one antenna selection indicator. The decoding order is a permutation of M integers, and indicates in which order the streams should be decoded for each possible mode. Because there are M! possible decoding orders, the feedback of the decoding order requires slightly more bits than simply an antenna selection indicator. For example, with M=4, the decoding order requires ceil(log2(M!))=5 bits in contrast to the antenna selection indicator which requires only ceil(log2 $(2^{M-1})$)=4 bits. SINR estimation and feedback can be done in a similar manner for SM with the only difference being that one CQI is estimated and fed back for each antenna combination.

The concept of diversity mode selection can also be applied to the rich feedback transmitter configuration shown in FIG. 7. According to the present invention, the number of data streams is changed adaptively as conditions change. Each data stream uses a set of sub-optimal filters given in Eq. 7. Further, depending on channel conditions, the "best" subset set of streams which are to be transmitted is selected, which is a type of channel selection. One interpretation of "best" is the subset of transmitted streams that supports the largest rate.

The selection of the diversity mode can be made by either the mobile station controller 34 or the base station controller 24. In the first instance, the mobile estimates the SINRs for all possible combinations of the transmitted data streams and chooses that particular combination that results in the maximum sum data rate. It then feeds back a CQI for each stream and corresponding set of the channel coefficients. For example, if mode-N is selected, then N CQIs and (M×L×N) channel coefficients are transmitted back, where M is the number of transmit antennas 28 and L is the number of taps of the transmitter pre-filters 212. It should be mentioned that N≦N_RX, where N_RX is the number of receive antennas 38. In the second instance, the mobile feeds back (M×L×N_RX) channel coefficients. In some situations, the power of other-cell interference would be required to feedback to the base station.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:
1. A base station comprising:
a transmitter having a plurality of transmit antennas;
a transmission control circuit operatively coupled to the transmitter and configured to:
select a desired feedback mode to be one of a rich feedback mode and a limited feedback mode based at least in part on past performance of the mobile station in said rich feedback and limited feedback modes, and configure said transmitter to use per antenna rate control if the limited feedback mode is selected;
select a diversity mode by selecting a subset of a set of transmit antennas to use for transmission to the mobile station when the limited feedback mode is selected; and configure the base station transmitter to use the selected antennas for transmission to said mobile station when the limited feedback mode is selected; and
a receiver to receive a diversity mode selection from a mobile station indicating a selected diversity mode, wherein the transmission control circuit configures the transmitter for the selected diversity mode responsive to receipt of the diversity mode selection from the mobile station.

2. The base station of claim 1 wherein the transmission control circuit further selects a desired feedback mode based at least in part on mobile station capability.

3. The base station of claim 1 wherein the transmission control circuit further selects a desired feedback mode based at least in part on mobile station speed or velocity.

4. The base station of claim 1 wherein the transmission control circuit further selects a desired feedback mode based at least in part on characteristics of the communication channel between the base station and the mobile station.

5. The base station of claim 1 further comprising a receiver to receive an antenna selection from the mobile station indicating a subset of selected antennas to use for transmission to the mobile station, wherein the transmission control circuit configures the transmitter to use the selected antennas.

6. The base station of claim 1 wherein the receiver receives an antenna selection indicating a subset of selected antennas to use for transmission to the mobile station, wherein the transmission control circuit configures the transmitter to use the selected antennas responsive to receipt of the antenna selection from the mobile station.

7. A base station comprising:
a transmitter having a plurality of transmit antennas; and
a transmission control circuit operatively coupled to the transmitter and configured to:
select a desired feedback mode to be one of a rich feedback mode and a limited feedback mode, and configure said transmitter to use matched field transmit diversity if rich feedback mode is selected;
select a diversity mode by selecting a number of data streams to transmit to a mobile station based on channel information feedback from the mobile station when rich feedback mode is selected; and
configure the base station transmitter for the selected diversity mode; and
said channel information feedback including channel coefficients for one or more propagation channels from the transmitter to the mobile station when rich feedback mode is selected.

8. A base station comprising:
a transmitter having a plurality of transmit antennas; and
a transmission control circuit operatively coupled to the transmitter and configured to:
select a desired feedback mode to be one of a rich feedback mode and a limited feedback mode, and configure said transmitter to use matched field transmit diversity if rich feedback mode is selected;
select a diversity mode by selecting a number of data streams to transmit to a mobile station based on channel information feedback from the mobile station when rich feedback mode is selected, and
configure the base station transmitter for the selected diversity mode by configuring a prefilter for each data stream based on said channel information feedback when rich feedback mode is selected.

9. The base station of claim 8 wherein the transmission control circuit configures each prefilter to match a propagation channel from all transmit antennas to a selected receive antenna at the mobile station.

10. A base station comprising:
a transmitter having a plurality of transmit antennas;
a receiver to receive a diversity mode selection from a mobile station indicating a number of data streams to transmit to the mobile station;
a transmission control circuit operatively coupled to the transmitter and configured to:
select a desired feedback mode to be one of a rich feedback mode and a limited feedback mode, and configure said transmitter to use matched field processing transmit diversity if rich feedback mode is selected;
configure the transmitter for a selected diversity mode responsive to receipt of the selected diversity mode from the mobile station by configuring a prefilter for each data stream to match the channel to a selected receive antenna at the mobile station when rich feedback mode is selected.

11. A base station comprising:
a transmitter having a plurality of transmit antennas;
a transmission control circuit operatively coupled to the transmitter for selecting a desired feedback mode to be one of a rich feedback mode and a limited feedback mode based at least in part on past performance of the mobile station in said rich feedback and limited feedback modes, and for configuring said transmitter based on the desired feedback mode; and
a receiver to receive channel information feedback corresponding to the selected feedback mode from a remote terminal, said channel information feedback including channel coefficients for one or more propagation channels from the transmitter to the mobile station.

12. The base station of claim 11 wherein the transmission control circuit further selects a desired feedback mode based at least in part on mobile station capability.

13. The base station of claim 11 wherein the transmission control circuit further selects a desired feedback mode based at least in part on mobile station speed or velocity.

14. The base station of claim 11 wherein the transmission control circuit further selects a desired feedback mode based at least in part on characteristics of the communication channel between the base station and the mobile station.

15. The base station of claim 11 wherein the transmission control circuit configures the transmitter to use a spatial multiplexing coding scheme if the limited feedback mode is selected.

16. The base station of claim 15 wherein the transmission control circuit further selects a diversity mode and configures the base station transmitter for the selected diversity mode.

17. The base station of claim 16 wherein the transmission control circuit selects a diversity mode by selecting a number of transmit antennas to use for transmission to said mobile station when the limited feedback mode is selected.

18. The base station of claim 17 wherein the transmission control circuit selects a diversity mode by selecting a subset of a set of transmit antennas to use for transmission to the mobile station when the limited feedback mode is selected, and wherein the transmission control circuit configures the transmitter to use the selected antennas.

19. The base station of claim 16 wherein said receiver further receives an antenna selection from the mobile station indicating a subset of selected antennas to use for transmission to the mobile station, wherein the transmission control circuit configures the transmitter to use the selected antennas.

20. The base station of claim 15 wherein said receiver further receives a diversity mode selection from a mobile station indicating a selected diversity mode, wherein the transmission control circuit configures the transmitter for the selected diversity mode responsive to receipt of the diversity mode selection from the mobile station.

21. The base station of claim 20 wherein the receiver receives an antenna selection indicating a subset of selected antennas to use for transmission to the mobile station, wherein the transmission control circuit configures the transmitter to use the selected antennas responsive to receipt of the antenna selection from the mobile station.

22. A base station comprising:
a transmitter having a plurality of transmit antennas;
a transmission control circuit operatively coupled to the transmitter for selecting a desired feedback mode to be one of a rich feedback mode and a limited feedback mode, and for configuring said transmitter to use per antenna rate control if the limited feedback mode is selected; and
a receiver configured to:
receive channel information feedback corresponding to the selected feedback mode from a remote terminal, said channel information feedback including channel coefficients for one or more propagation channels from the transmitter to the mobile station; and
receive a diversity mode selection from a mobile station indicating a selected diversity mode, wherein the transmission control circuit configures the transmitter for the selected diversity mode responsive to receipt of the diversity mode selection from the mobile station.

23. The base station of claim 22 wherein the transmission control circuit further selects a diversity mode and configures the base station transmitter for the selected diversity mode.

24. The base station of claim 23 wherein the transmission control circuit selects a diversity mode by selecting a number of transmit antennas to use for transmission to said mobile station when the limited feedback mode is selected.

25. The base station of claim 24 wherein the transmission control circuit selects a diversity mode by selecting a subset of a set of transmit antennas to use for transmission to the mobile station when the limited feedback mode is selected, and wherein the transmission control circuit configures the transmitter to use the selected antennas.

26. The base station of claim 23 wherein said receiver is further configured to receive an antenna selection from the mobile station indicating a subset of selected antennas to use for transmission to the mobile station, wherein the transmission control circuit configures the transmitter to use the selected antennas.

27. The base station of claim 22 wherein the receiver is further configured to receive an antenna selection indicating a subset of selected antennas to use for transmission to the mobile station, wherein the transmission control circuit configures the transmitter to use the selected antennas responsive to receipt of the antenna selection from the mobile station.

28. A base station comprising:
a transmitter having a plurality of transmit antennas;
a transmission control circuit operatively coupled to the transmitter for selecting a desired feedback mode to be one of a rich feedback mode and a limited feedback mode, and for configuring said transmitter to use matched field processing transmit diversity if rich feedback mode is selected; and
a receiver to receive channel information feedback corresponding to the selected feedback mode from a remote terminal, said channel information feedback including channel coefficients for one or more propagation channels from the transmitter to the mobile station.

29. The base station of claim 28 wherein the transmission control circuit selects a diversity mode based on said channel information feedback received from the mobile station and configures the base station transmitter for the selected diversity mode.

30. The base station of claim 29 wherein the transmission control circuit selects a diversity mode by selecting a number of data streams to transmit to the mobile station based on said channel information feedback when the rich feedback mode is selected.

31. The base station of claim 30 wherein the transmission control circuit is further configured to configure the transmitter by configuring a prefilter for each data stream based on said channel information feedback when the rich feedback mode is selected.

32. The base station of claim 31 wherein the transmission control circuit is further configured to configure each prefilter to match a propagation channel from all transmit antennas to a selected receive antenna at the mobile station.

33. The base station of claim 28 wherein said receiver further receives a diversity mode selection from the mobile station indicating a selected diversity mode, wherein the transmission control circuit configures the station transmitter for the selected diversity mode responsive to receipt of a diversity mode selection from the mobile station.

34. The base station of claim 33 wherein the diversity mode selection indicates the number of data streams to transmit to the mobile station, and wherein configuring the base station transmitter includes configuring a prefilter for each data stream when the rich feedback mode is selected.

35. The base station of claim 34 wherein each prefilter is configured to match the channel to a selected receive antenna at the mobile station.

* * * * *

UNITED STATES PATENT AND TRADEMARK OFFICE
CERTIFICATE OF CORRECTION

PATENT NO. : 8,515,435 B2  
APPLICATION NO. : 11/045877  
DATED : August 20, 2013  
INVENTOR(S) : Krasny et al.

Page 1 of 1

It is certified that error appears in the above-identified patent and that said Letters Patent is hereby corrected as shown below:

On Title Page 2, Item (56), under "OTHER PUBLICATIONS", in Column 1, Line 2, delete "andl" and insert -- and --, therefor.

On Title Page 2, Item (56), under "OTHER PUBLICATIONS", in Column 1, Line 13, delete "constellaton" and insert -- constellation --, therefor.

On Title Page 2, Item (56), under "OTHER PUBLICATIONS", in Column 2, Line 11, delete "Assilomar" and insert -- Asilomar --, therefor.

On Title Page 2, Item (56), under "OTHER PUBLICATIONS", in Column 2, Line 43, delete "Partership" and insert -- Partnership --, therefor.

In the Specification

In Column 4, Line 4, delete "closed-loop rich" and insert -- rich --, therefor.

In Column 4, Lines 13-14, delete "slesed-leap rich" and insert -- rich --, therefor.

In Column 5, Line 59, delete "X(t)" and insert -- x(t) --, therefor.

In Column 7, Line 44, delete "transmitter 20" and insert -- transmitter 22 --, therefor.

In Column 8, Line 23, delete "(SMFTD)" and insert -- (S-MFTD) --, therefor.

In Column 8, Line 50, delete "described" and insert -- is described --, therefor.

In Column 9, Line 31, delete "P/12;" and insert -- P/2; --, therefor.

Signed and Sealed this  
Twenty-eighth Day of January, 2014

Michelle K. Lee  
*Deputy Director of the United States Patent and Trademark Office*